US011106445B2

(12) United States Patent
Beckman et al.

(10) Patent No.: US 11,106,445 B2
(45) Date of Patent: *Aug. 31, 2021

(54) CLIENT APPLICATION WITH EMBEDDED SERVER

(71) Applicant: Open Text SA ULC, Halifax (CA)

(72) Inventors: Gregory Beckman, Baden (CA); Benjamin Barth, Waterloo (CA)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,853

(22) Filed: Jan. 6, 2020

(65) Prior Publication Data

US 2020/0150944 A1 May 14, 2020

Related U.S. Application Data

(63) Continuation of application No. 16/113,663, filed on Aug. 27, 2018, now Pat. No. 10,540,161, which is a (Continued)

(51) Int. Cl.
*G06F 8/61* (2018.01)
*G06F 8/658* (2018.01)
(Continued)

(52) U.S. Cl.
CPC .............. *G06F 8/61* (2013.01); *G06F 8/656* (2018.02); *G06F 8/658* (2018.02); (Continued)

(58) Field of Classification Search
CPC . H04L 67/06; H04L 67/32; G06F 8/61; G06F 8/656; G06F 8/658; G06F 9/45529
See application file for complete search history.

(56) References Cited

U.S. PATENT DOCUMENTS 7,272,782 B2 * 9/2007 Sneh ..................... G06F 40/174
715/205
10,101,983 B2 * 10/2018 Beckman ............ G06F 9/45529
(Continued)

FOREIGN PATENT DOCUMENTS

| EP | 1705837 A1 | 9/2006 |
| EP | 2605607 A1 | 6/2013 |
| EP | 2680135 A1 | 1/2014 |

OTHER PUBLICATIONS

Mixed Content—Security | MDN, retrieved from «https://developer.mozilia.org/en/docs/Security/MixedContent» on Oct. 22, 2015, 3 pages.
(Continued)

*Primary Examiner* — Marina Lee
(74) *Attorney, Agent, or Firm* — Sprinkle IP Law Group

(57) ABSTRACT

Embodiments provide a web-based editing tool that intelligently leverages certain functionality of a browser, web client, desktop client, and native software at the client side to provide seamless user experience when editing a file over a network. Responsive to a user selecting a file for editing, the web client may send a passive content request to a web server embedded in the desktop client at a specific address on the client device. If no response, the web client prompts the user to start or install the desktop client on the client device. If a response is received, the web client sends a request to the desktop client with a user identifier and authorization to download the file from a server. The desktop client downloads the file, opens it in the native software, monitors the file being edited, and updates a delta associated with the file to the server.

20 Claims, 10 Drawing Sheets

Related U.S. Application Data continuation of application No. 14/935,025, filed on Nov. 6, 2015, now Pat. No. 10,101,983.

(60) Provisional application No. 62/076,630, filed on Nov. 7, 2014.

(51) Int. Cl.
*G06F 9/455* (2018.01)
*G06F 8/656* (2018.01)
*H04L 29/08* (2006.01)

(52) U.S. Cl.
CPC .......... *G06F 9/45529* (2013.01); *H04L 67/06* (2013.01); *H04L 67/32* (2013.01)

(56) References Cited

U.S. PATENT DOCUMENTS

| | | |
|---|---|---|
| 1,054,016 A1 | 1/2020 | Beckman |
| 10,540,161 B2* | 1/2020 | Beckman ................ H04L 67/06 |
| 2008/0091947 A1* | 4/2008 | Dancer ............... H04L 63/0442 |
| | | 713/171 |
| 2008/0163202 A1 | 7/2008 | Kembel |
| 2009/0036105 A1 | 2/2009 | Canon |
| 2009/0063699 A1* | 3/2009 | Chapweske .......... H04N 21/235 |
| | | 709/233 |
| 2011/0055322 A1* | 3/2011 | Gregersen ........... H04L 67/2814 |
| | | 709/203 |
| 2011/0138268 A1 | 6/2011 | Zhang |
| 2012/0246114 A1* | 9/2012 | Edmiston ................ G06T 11/60 |
| | | 707/625 |
| 2012/0296845 A1* | 11/2012 | Andrews ................ G06Q 40/06 |
| | | 705/36 R |
| 2014/0289360 A1* | 9/2014 | Mahkovec .............. H04L 67/10 |
| | | 709/217 |
| 2018/0364997 A1 | 12/2018 | Beckman et al. |
| 2020/0150944 A1* | 5/2020 | Beckman .................. G06F 8/61 |

OTHER PUBLICATIONS

Mixed Content W3C First Public Working Draft, Jul. 22, 2014, retrieved from <http://www.w3.org/TR/2014/WD-mixed-content-20140722/> on Oct. 22, 2015, 24 pages.
European Search Report for European Patent Application No. EP 15193659.8, dated Mar. 9, 2016, 7 pgs.
Office Action for U.S. Appl. No. 14/935,025, dated May 22, 2017, 26 pgs.
Office Action for U.S. Appl. No. 14/935,025, dated Nov. 1, 2017, 32 pgs.
Notice of Allowance for European Patent Application No. 15 193 659.8, dated Nov. 26, 2018, 46 pgs.
Notice of Allowance for U.S. Appl. No. 16/113,663, dated Sep. 23, 2019, 12 pgs.

* cited by examiner

CLIENT APPLICATION WITH EMBEDDED SERVER

CROSS-REFERENCE TO RELATED APPLICATIONS

This application is a continuation of, and claims a benefit of priority under 35 U.S.C. § 120 from, U.S. patent application Ser. No. 16/113,663, filed Aug. 27, 2018, now U.S. Pat. No. 10,540,161, entitled "CLIENT APPLICATION WITH EMBEDDED SERVER," which is a continuation of, and claims a benefit of priority under 35 U.S.C. § 120 from, U.S. patent application Ser. No. 14/935,025, filed Nov. 6, 2015, entitled "CLIENT APPLICATION WITH EMBEDDED SERVER," now U.S. Pat. No. 10,101,983, which claims a benefit of priority from U.S. Provisional Application No. 62/076,630, filed Nov. 7, 2014, entitled "CLIENT APPLICATION WITH EMBEDDED SERVER." All applications referenced in this paragraph are fully incorporated by reference herein for all purposes.

TECHNICAL FIELD

This disclosure relates generally to desktop client applications that can communicate with backend servers. More particularly, this disclosure relates to systems, methods, and computer program products that enable a web application to communicate with a desktop client application via an embedded web server and a standard browser application running on a client device.

BACKGROUND OF THE RELATED ART

In an enterprise computing environment, often when a user edits a file (e.g., a document) that is stored and/or managed by a backend system such as a content server, document server, media server, or the like, the user has to download the file onto their devices (assuming that the user already has the appropriate client software running on their devices that can communicate with the backend system), open the file using an appropriate editor such as a proprietary editing tool of the client software, edit the file (e.g., correct a typographical error), save the file, and upload a new version of the file back to the backend system. This process can be cumbersome, tedious, and time consuming. It may also prove challenging for non-technical users.

To make the process easier for end users, some backend systems may allow user access via a web application (e.g., a web client of a backend system) executing in a standard browser application running on a client device such as a mobile device, desktop computer, laptop computer, etc. However, for security reasons, standard browser applications do not allow such a web application to communicate directly with a local computer program (such as a client application of a backend system) that is also running on the client device. This security measure is built into the communications protocols of all standard browser applications.

To overcome this obstacle, one approach is to provide narrowly tailored, browser-specific plug-ins, add-ons, extensions, scripts, or the like, that are particularly programmed to allow specific web applications to communicate with specific computer programs locally. Still, this approach requires cumbersome installation and/or certain level of knowledge in computer programming language.

SUMMARY OF THE DISCLOSURE

Leveraging existing functionality of standard browser applications and native software, embodiments disclosed herein provide a unique solution that enables a web application executing in a browser application to communicate with a desktop application locally without requiring cumbersome installation of browser-specific plug-ins, add-ons, extensions, scripts, or the like, and without compromising the security measures built-in to the standard browser applications. Advantageously, embodiments can provide a seamless user experience, automatically and dynamically performing functions needed for a user to edit a file managed by a backend system embodied on one or more server machines operating at the backend in an enterprise computing environment or in a cloud computing environment.

In some embodiments, a method for web-based editing of a file may include a user directing a browser application executing on a computing device to a particular network address associated with a web application. The browser application may download code associated with the web application and provide a runtime environment for the web application. The code may include instructions for constructing passive content requests to a web server embedded in a client application and configuration information associated with the embedded web server (e.g., a specific address or communication port on a client device designated for the web server).

A user interface of the web application may be configured with a browse/navigation functionality for navigating a file structure managed and stored remotely, e.g., by the backend system. The file structure may contain a representation of a file that the user wishes to edit. The web application may receive, via the user interface, an indication of the user selecting the file for editing. In response, the web application may first determine the presence of a client application on the computing device by constructing and sending a passive content request to a specific port on the computing device designated for a web server which is embedded in and is a component of the client application.

The passive content request may include, for instance, a web application programming interface (API) call to load passive content such as an image object, a text object, an audio object, a video object, etc.

If no response is received (i.e., the client application is not on or is not running on the computing device), the web application prompts the user to start or install the client application on the computing device. If a response is received (i.e., the client application is already executing on the computing device), the web application constructs and sends a request to the client application with a user identifier and authorization to download the file. The client application is configured to download the file, monitor the download progress, and provide update(s) on the download progress to the web application. For example, the web application may send a download status request to the client application and, in response, the client application may determine a progress on downloading the file from a backend server and return a progress update to the web application. Such a progress update may be in the form of an image or an attribute such as a height or a width of an image. The web application, in turn, may use the information received from the client application to prepare and present a progress bar on the user interface to inform the user of the download progress.

In some embodiments, the communication mechanism between the web application and the client application may be utilized to determine a version of the client application. For example, the web application may be configured to determine a version of the client application based on an image attribute contained in a response received from the client application. This can help the web application to determine how to communicate with components of the client application, including the embedded web server.

After the file is downloaded onto the computing device, the client application may open the file in the native software, monitor the file while the file is being edited, and upload a delta associated with the file to the backend. In this case, the delta represents any changes between a first version of the file downloaded for editing and a second version of the file saved by the native software on the computing device.

In some embodiments, the client application may be a small, lightweight, executable file. In some embodiments, when installed, an icon of the client application may be placed in the system tray (e.g., a section of the taskbars in the Microsoft Windows desktop user interface). In some embodiments, the client application may be configured to provide native notifications from an application server, independently of the web application.

One embodiment comprises a system comprising at least one processor and at least one non-transitory computer-readable storage medium that stores computer instructions translatable by the at least one processor to perform a method substantially as described herein. Another embodiment comprises a computer program product having a non-transitory computer-readable storage medium that stores computer instructions translatable by a processor to perform a method substantially as described herein. Numerous other embodiments are also possible.

Embodiments disclosed herein can provide many advantages. For example, proprietary file types normally could not be edited using web-based editors. Embodiments provide a solution that enables a user to interact with proprietary file types, including performing editing, via a web application running in a browser environment. Another advantage is that a user does not need to download and/or install custom plug-in(s) in order to extend the functionality of a browser. Instead, a web application can facilitate browsing and when editing of a particular file is needed, the web application can cause the file be downloaded and native software launched so the user can use the native software to do the editing. A client application can automatically handle the communications with the backend server to ensure that the edited file is uploaded. This approach works across browsers and across platforms, with minimal configuration efforts on the part of the user.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention and therefore are exemplary and non-limiting. A more complete understanding of the disclosure and the advantages thereof may be acquired by referring to the following description, taken in conjunction with the accompanying drawings in which like reference numbers indicate like features. Note that the features illustrated in the drawings are not necessarily drawn to scale.

FIGS. 2A-2F depict diagrammatic representations of various portions of a user interface of a web application executing in a browser application running on a client device communicatively connected to a server machine at the backend hosting the web application, according to some embodiments disclosed herein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Figure 1:
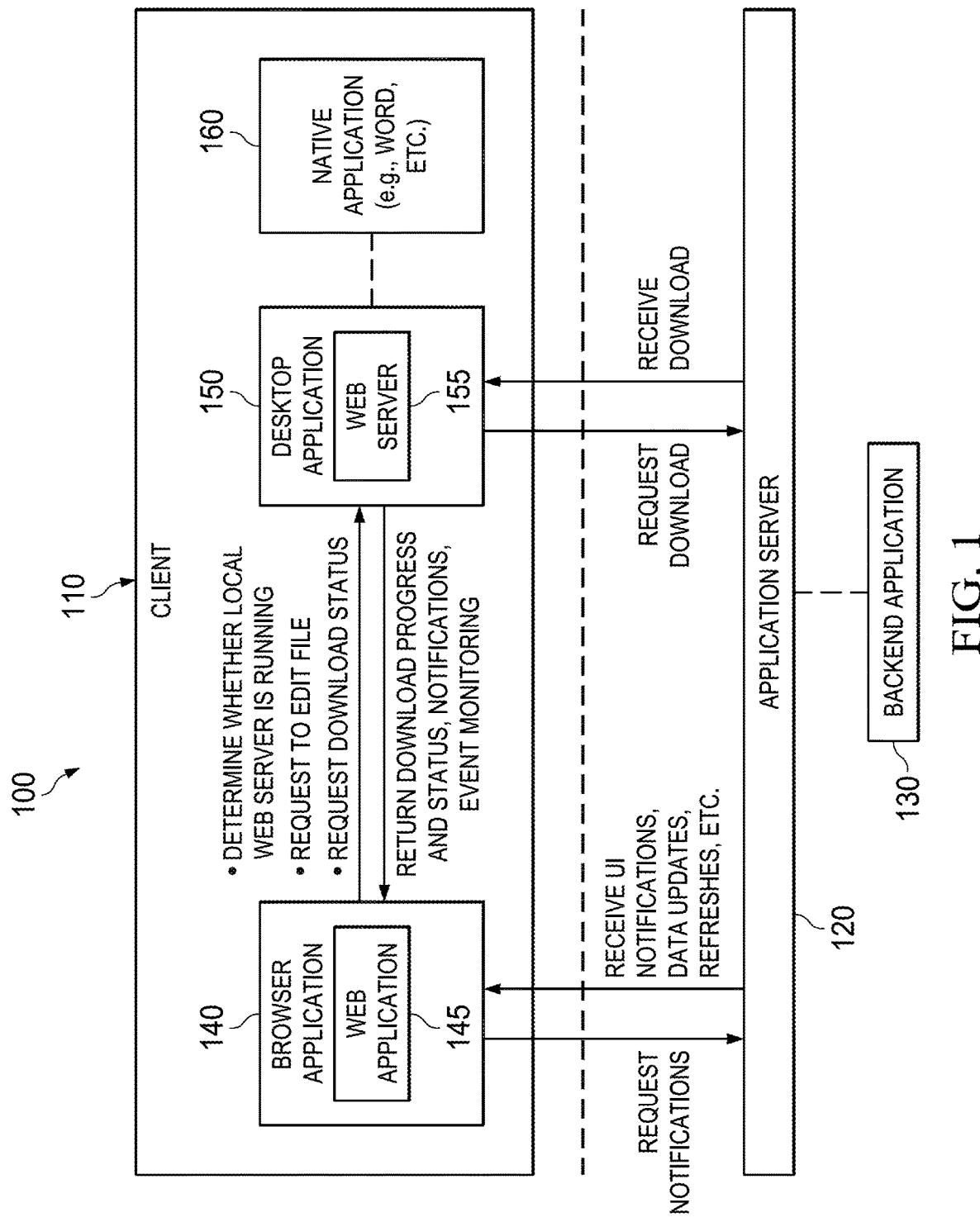
FIG. 1 depicts a diagrammatic representation of an example client-server architecture for implementing embodiments disclosed herein.

FIG. 1 depicts a diagrammatic representation of an example client-server architecture 100 for implementing embodiments disclosed herein. Client-server architecture 100 shown in FIG. 1 leverages a unique combination of features enabled by web application 145, which runs within browser application 140, and web server 155, which runs within desktop application 150, at the client side (e.g., on client device 110). Desktop application 150 may be a standalone client application of a backend system (e.g., backend application 130) embodied on one or more server machines (e.g., application server 120) at the server side. Skilled artisans appreciate that desktop application 150 represents a non-limiting example of a standalone client application of a backend system, that desktop application 150 may be adapted to run on various types of computing devices and not be limited to desktop computers, and that client device 110 can be any such computing device on which desktop application 150 is embodied.

In some embodiments, web server 155 may be programmed as a component of desktop application 150 and may communicate with other components of desktop application 150 via application programming interface (API) calls. In some embodiments, web server 155 may be implemented using node.js. Node.js refers to a cross-platform runtime environment normally used for developing server-side web applications and a built-in library to allow such applications to act as a web server. As known, a web server typically resides at the server side for storing, processing, and delivering web pages to clients via Hypertext Transfer Protocol (HTTP), which is a network communications protocol for distribution of information on the World Wide Web. In the example illustrated, web server 155 is embedded within desktop application 150 and is local to client device 110, which also runs browser application 140. In some embodiments, web server 155 may be referred to as an embedded web server, a client-side web server, and/or a local web server.

Desktop application 150 represents an example of a unique client application that can serve as a client of application server 120 at the backend and that includes web server 155 at the client side. Web server 155 (which, as discussed above, is a built-in component of desktop application 150) allows the client application to communicate with web application 145 running on client device 110.

Specifically, web server 155 enables web application 145 to communicate with desktop application 150 (all of which run on client device 110) in a safe and secure manner. Security is achieved by preinstalling web server 155 in desktop application 150. In some embodiments, authenticating web server 155 (though not necessary), and using a uniform resource locator (URL) of web server 155 may be known by web application 145, as explained below. A variety of notifications and event monitoring are enabled using passive network requests that can request and enable receiving of content in web application 145. Other types of notifications and/or event monitoring are enabled by the integration between web application 145, desktop application 150, and web server 155. Web server 155 can communicate with server-side systems, including backend application(s) 130 such as, but not limited to, enterprise content server applications. As long as web application 145 has the correct URL of web server 155, web application 145 can communicate with web server 155 embedded within desktop application 150 to request notifications and/or event monitoring. Desktop application 150 can, in turn, communicate with application server 120 over a network and act as an intermediary between web application 145 at the client-side and application server 120 at the server-side.

Note that desktop application 150 (and hence web server 155) does not need to reside on client device 110 initially or at all times. As will be further explained below, desktop application 150 may be downloaded and installed responsive to a user requesting to edit a file via web application 145. Desktop application 150 can download the requested file from application server 120 and launch native application 160 (native as to the file of interest) which opens the file in its native form and which provides the appropriate edit function with which content of the file can be edited. As illustrated in FIG. 1, native application 160 does not communicate directly with application server 120 and/or backend application 130. Rather, when a user is finished with editing the file and saves via native application 160, desktop application 150 can upload a new version of the file to application server 120 and notify backend application 130 that a new version of the file has been created.

A non-limiting example of this process is illustrated in FIGS. 2A-2F.

Figure 2A:
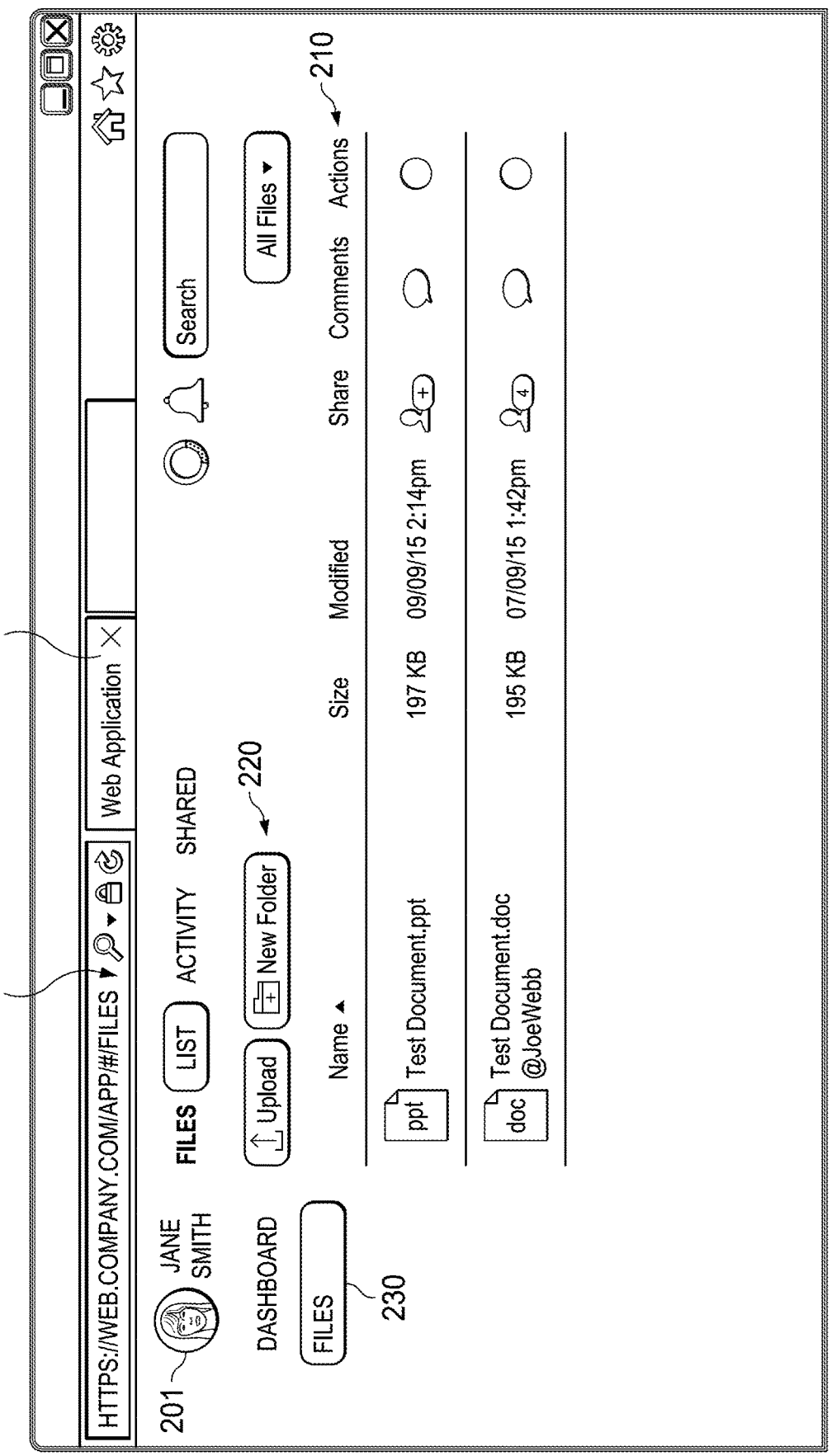

FIG. 2A depicts a diagrammatic representation of a portion 247a of a web-based user interface (which, in the example illustrated, is referred to as "Dashboard" and which is implemented as a web page hosted at a particular universal resource locator address on an enterprise network) of web application 245 executing in browser application 240 running on a computing device (e.g., client device 110 shown in FIG. 1) communicatively connected to a server machine (e.g., application server 120) on which a server application (e.g., backend application 130) is run at the backend. Web application 245, which is downloaded by browser application 240 and which runs on the computing device, includes code to make an application protocol call (e.g., via a web API) to a web server component of a desktop application. Skilled artisans appreciate that web APIs refer to the defined interfaces through which interactions may take place between an enterprise and applications that use its assets. A web API may be defined as a set of Hypertext Transfer Protocol (HTTP) request messages and a definition of the structure of response messages, usually in an Extensible Markup Language (XML) or JavaScript Object Notation (JSON) format.

User 201 may log in to the server application via web application 245 (which is a web client of the server application running at the backend) with, for instance, a user identifier (ID) and a credential (e.g., a password). Additional and/or alternative methods may be used to access and/or communicate with the server application (see e.g., FIGS. 4A-4F).

After user 201 is logged in, user 201 can use the browse function of browser application 240 to navigate folders and files stored remotely on the backend server machine(s). In a sense, web application 245 provides a window to files that user 201 has stored and/or is allowed to access/preview at the backend. This view/preview function of web application 245 may allow user 201 to preview the content of a file without needing to run a native application.

In the example illustrated, user 201 can view a list of files 230 that user 201 has created, shared, and/or is permitted to share, comment, and/or take certain action (e.g., via menu items 210). In addition to menu items 210, web application 245 may provide various functions 220 (e.g., file upload, make new folder, etc.) that are accessible via various function actuation mechanisms (e.g., buttons, hover over, links, icons, etc., collectively referred to hereinafter as "button" or "buttons").

Figure 2B:
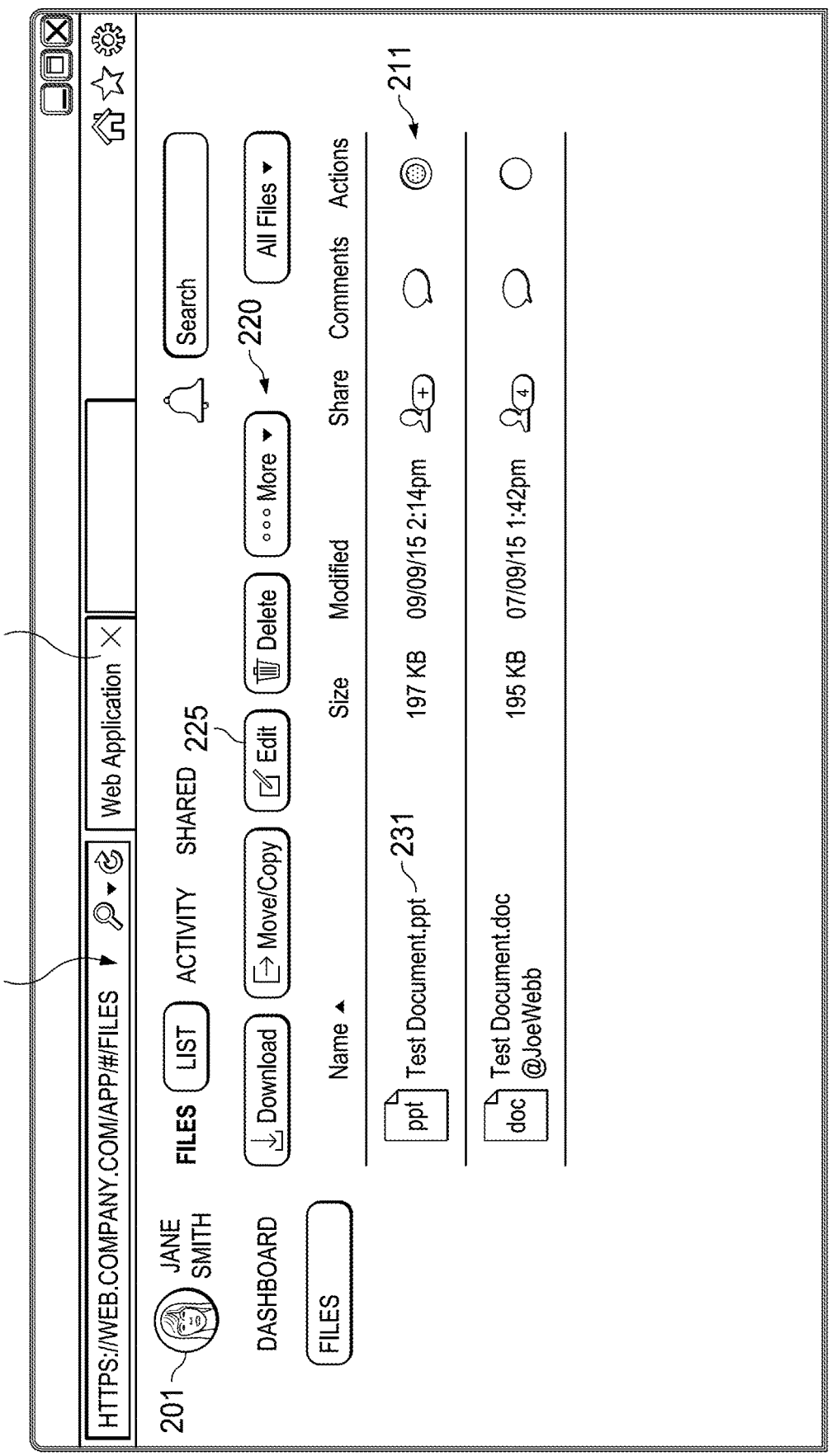

FIG. 2B depicts a diagrammatic representation of a portion 247b of the user interface of web application 245. In the example illustrated, responsive to user 201 selecting button 211 for "Actions" corresponding to file 231 (which indicates that user 201 may wish to take certain action on file 231), web application 245 expands functions 220 to include additional buttons such as button 225 representing an edit function.

Figure 3:
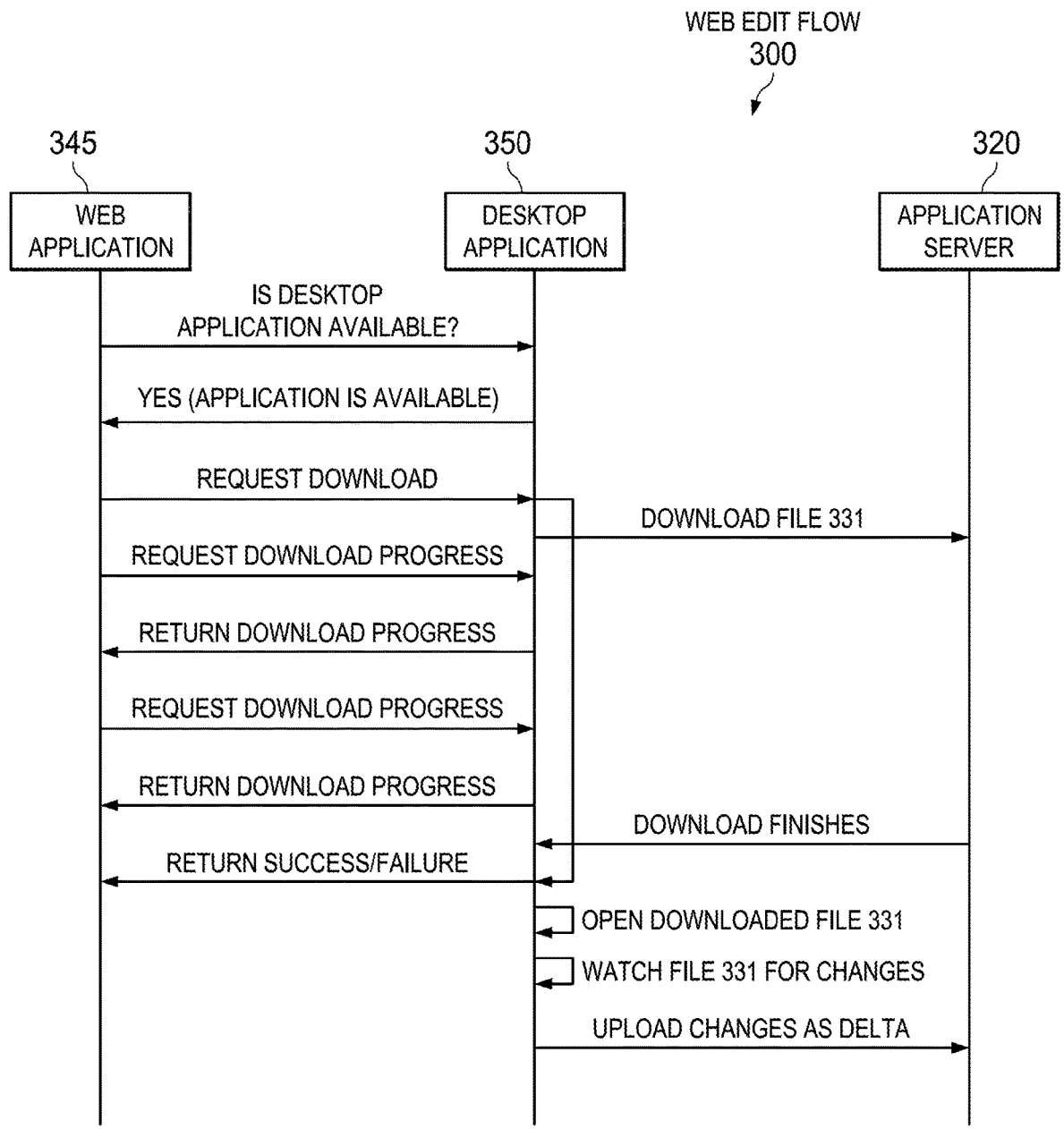
FIG. 3 depicts a flow diagram illustrating an example process flow responsive to a user edit request according to some embodiments disclosed herein.

Responsive to user 201 clicking, selecting, or otherwise actuating button 225, web application 245 initiates a process to launch native software (e.g., native application 160 of FIG. 1) associated with file 231, download file 231 from a backend server, monitor the downloading of file 231, launch a native application to open file 231, monitor file 231 for changes, and upload the changes or otherwise notify the backend server that a new version of file 231 has been created. An example of this process is illustrated in FIG. 3.

In the example illustrated, web edit flow 300 may include interactions among web application 345, desktop application 350 and application server 320. Web application 345 may implement an embodiment of web application 145 of FIG. 1 or web application 245 of FIGS. 2A-2F. Desktop application 350 may implement an embodiment of desktop application 150 of FIG. 1 or desktop application 450 of FIGS. 4A-4F. Application server 320 can be any appropriate application server such as application server 120 operating at the backend. Web application 345 is hosted by application server 320 and communicates remotely with application server 320 over secured connections such as HTTPS.

Because both web application 345 and desktop application 350 run on the same local machine, there is no need for a secure connection which requires a certificate. However, as discussed above, due to the standard security measures employed by today's browser applications, web application 345 (which is implemented as a secure web page) is prevented from communicating with unsecure web pages. This means that web application 345 normally cannot communicate with desktop application 350 (which includes an unsecured web server).

To overcome this obstacle, web application 345 may be configured to communicate with desktop application 350 in a novel way. More specifically, in some embodiments, responsive to a user edit request, web application 345 may first send a request (e.g., a web API call such as an HTTP call over an unsecured connection) to desktop application 350 (e.g., desktop application 150 of FIG. 1) to detect whether desktop application 350 is listening and thus is already running locally on the same computing device (e.g., client device 110 of FIG. 1). The request is a non-executable, passive content request to a web server embedded within desktop application 350. In this disclosure, a passive content request is a request for passive content.

Many types of passive content requests are available, including (but not limited to) an image element request, which may be in the form of a HyperText Markup Language (HTML) image <img> tag. The HTML image tag is used to place an image on a web page. An example of an <img> tag is as follows: <img src="image1.jpg">, where "src" refers to a source and instructs a browser application where the image (in this example, "image1.jpg") is located.

The <img> tag may be prebuilt (e.g., loaded in the HTML portion of a web source page), and/or dynamically built by a web application script, such as, but not limited to, JavaScript. The <img> tag includes a source attribute that can include a URL to the embedded web server. Responsive to receiving the URL request from web application 345 (via the embedded web server), desktop application 350 can provide an informative image, which gets returned and loaded into web application 345. The image can include an update to the percentage of content downloaded from application server 320 over a network. For example, at a first time, desktop application 350 may return an image that indicates that 10% of the content has been downloaded from application server 320; at a subsequent second time, desktop application 350 can return an image that indicates that 60% of the content has been downloaded; and so on.

In some embodiments, web application 345 may use the attribute(s) (e.g., height and/or width) of the image returned by desktop application 350 to determine the version of desktop application 350. This allows web application 345 to determine the appropriate API call to make when communicating with the embedded web server of desktop application 350. In some embodiments, instead of sending an image, desktop application 350 may send attribute(s) sufficient to allow web application 345 to compute the download progress and/or the current version of desktop application 350.

The API call may include a passive content request or any request that does not cause an action to be taken on a web page. In some embodiments, a passive content request includes a URL to access the embedded web server. Specifically, the URL can include the port to the embedded web server. The URL (and/or port number) may be predetermined to be a default location on the embedded web server, or in some instances, the URL may be negotiated between web application 345 and desktop application 350.

In some embodiments, such a passive content request is used by web application 345 to communicate with the embedded web server of desktop application 350. The risk of rendering a manipulated passive resource (e.g., an image object) is significantly lower than executing an active resource. Thus, loading an image is not considered a high security risk by most standard browser applications, which means that web application 345 is allowed by the browser application to communicate with desktop application 350 which, in turn, is configured to open the requested file in its native editing environment. In this way, the user's action of clicking on the edit button within web application 345 allows for communication from web application 345 in the user's browser application to the user's desktop application 350 to the editing program running on the user's device. This allows for a very seamless editing experience and also allows desktop application 350 to communicate back to web application 345 to provide status updates/notifications when the user is done editing. This mechanism and technique advantageously does not require installing and executing web plugs-in and/or generating specific server-side or client-side scripts for each particular type and unique combination of web application, web application, client environment, and/or server environment.

As a non-limiting example, code (in JavaScript) for making an initial web API call to a web server component (e.g., web server 155 of FIG. 1) of desktop application 350 (over an unsecure connection) can comprise:

```
var desktopClientAvailable = function (isDesktopClientAvailable) {
    var available = new Image( );
    available.onerror = function( ) {
        isDesktopClientAvailable(false);
    };
    available.onload = function( ) {
        isDesktopClientAvailable(true);
    };
    // Add timestamp to prevent browser caching
    available.src = 'http://127.0.0.255:99999/api/v2?ts=' +
    new Date( ).getTime( );
};
```

As discussed above, this code is included in web application 345 when web application 345 is downloaded from application server 320. The code identifies a specific local port of a web server (e.g., node.js at a predetermined Internet Protocol (IP) address) and directs a browser to request certain passive content (e.g., an image object) from the web server.

Passive content includes resources which cannot directly interact with or modify other resources on a web page. Types of passive content can include, for example, images, texts (fonts), audios, and videos. Other types of passive requests may also be used including, but are not limited to, images loaded via an img or picture; video loaded via video and source elements, audio loaded via audio and source elements, prefetched content, fetch request contexts: image, media, and prefetch, etc.

For the purpose of detecting whether desktop application 350 exists and/or is already running on the local machine, the actual content (which is the subject of the call) does not matter. What matters is whether desktop application 350 responds to the call. If web application 345 receives a response to the call from desktop application 350, then desktop application 350 is running. If web application 345 receives no response from desktop application 350, an error may have occurred.

If web application 345 receives no response from the first call, the user is redirected to a page where the user is asked to start and/or install desktop application 350. In some embodiments, desktop application 350 can be a lightweight, small executable file which is then added to the system tray.

Figure 2C:
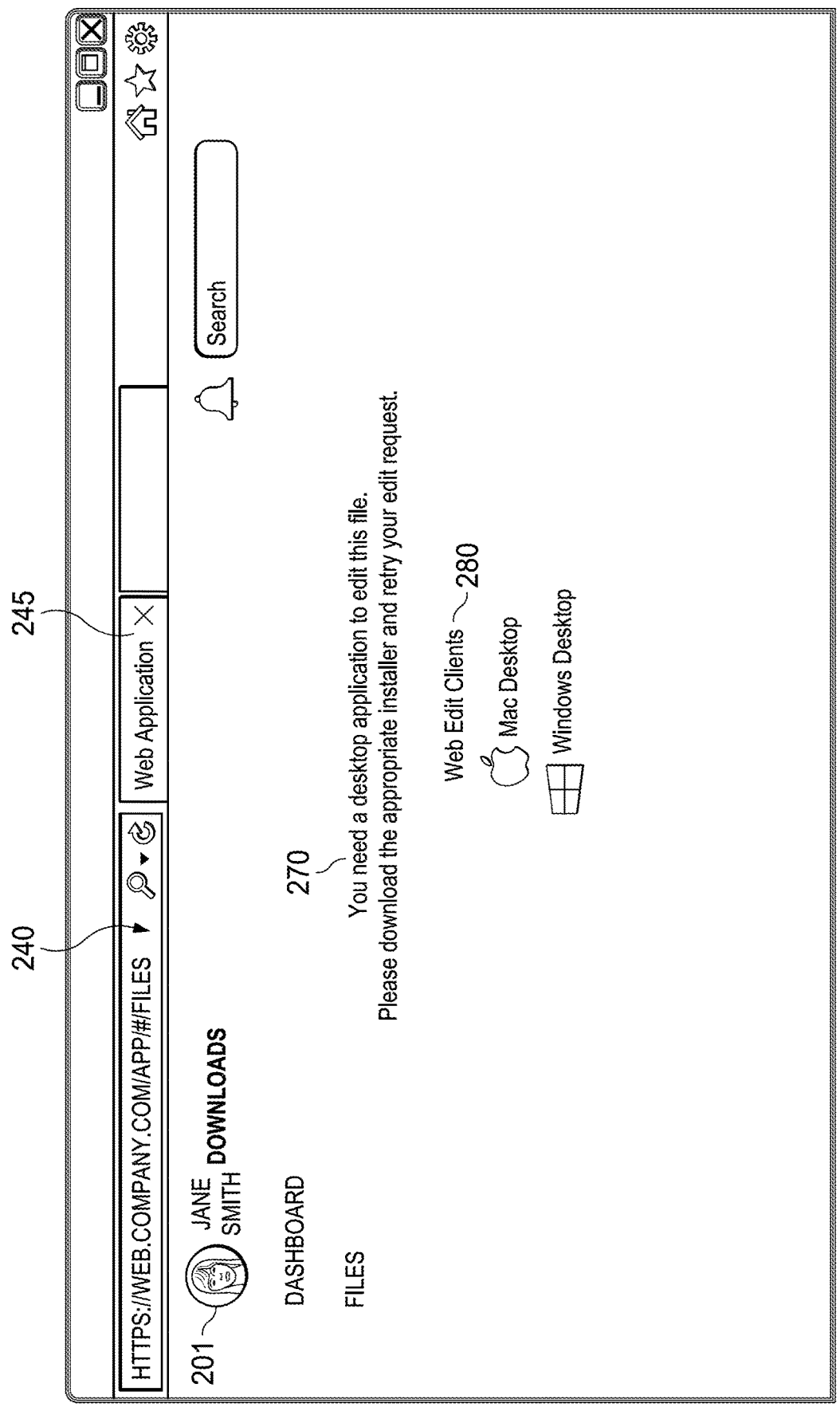
Figure 2D:
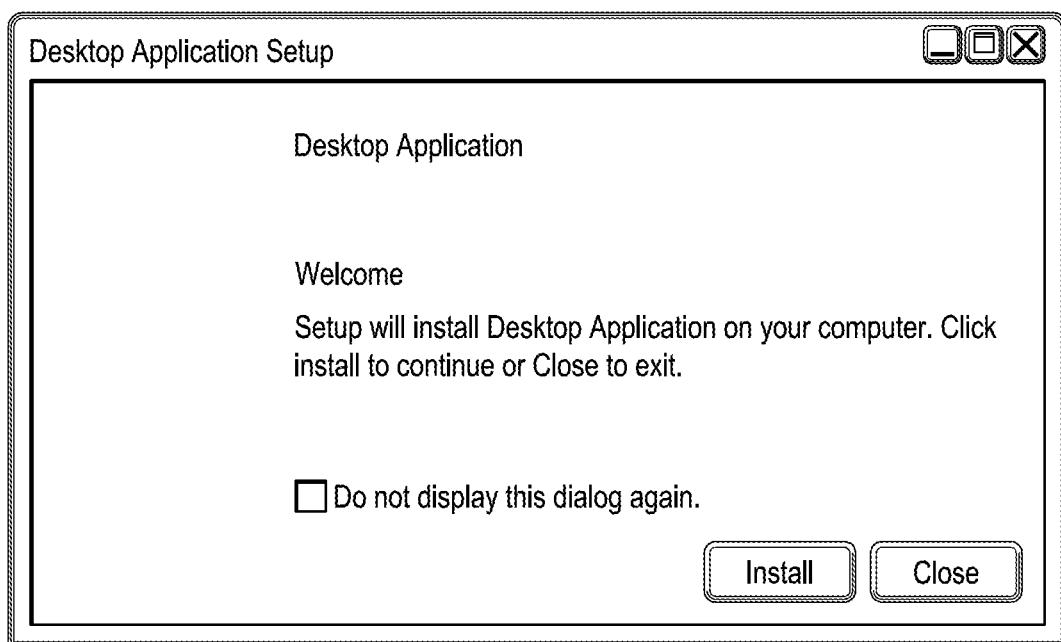

As an example, referring to FIG. 2C, when no response to a passive content request is received from a local desktop application, web application 245 may generate portion 247c of its user interface with error message 270 (e.g., one that notifies user 201 that a desktop application is needed) and one or more options 280 to install an appropriate version of client software. FIG. 2D depicts a diagrammatic representation of dialog box 247d generated by web application 245 subsequent to client software "Desktop Application" being selected for installation on the local machine.

Returning to FIG. 3, if or when desktop application 350 is available, web application 245 may initiate a process for desktop application 350 to download a file of interest (e.g., file 331) from application server 320. Desktop application 350, in turn, communicates with application server 320 and downloads file 331 from application server 320.

Specifically, if web application 345 receives a response from the first call, indicating that desktop application 350 is running on the user's device, web application 345 sends a request to desktop application 350 to download file 331. This file download request from web application 345 may include a unique ID for file 331 and also a token which is authorization that allows desktop application 350 to make a download request to application server 320 for file 331.

Conventionally, file downloads are handled by a browser application. Since, in this case, the browser application (which provides the runtime environment for web application 345) is not involved in downloading file 331, the browser application does not have knowledge of the downloading progress/status and, as such, does not construct a download progress/status bar. Instead, web application 345 sends requests for download progress to desktop application 350 and, based on response(s) from desktop application 350, provides real time updates on the download progress of file 331.

In some embodiments, one or more web API calls can be made by web application 345 to request desktop application 350 to provide a progress report or status update on the download (e.g., what is the percentage of download so far?). The embedded web server of desktop application 350 receives a web application request (via a HTTP connection) for the current download progress associated with content downloaded from application server 320. In some embodiments, desktop application 350 may return an image to web application 345 with a one-pixel height, and a width representative of a download progress of the content. For example, a one-pixel width image can represent a download progress of 0%; a two-pixel width image can represent a download progress of 1%; etc. In some embodiments, up to a 101 pixel width image may represent a completed content download. In a further embodiment, web application 345 may generate an image object to represent the download progress of content from application server 320 over the network.

As a non-limiting example, code (in JavaScript) for making a web API call to a web server component (e.g., web server 155 of FIG. 1) of desktop application 350 to request current download status can comprise:

```
function updateProgressIndicator( ) {
    var progress = new Image( );
    progress.onerror = function( ) {
        if($scope.currentDownload) {
            $timeout(function( ) {
                updateProgressIndicator( );
            }, 100);
        }
    };
    progress.onload = function( ) {
        if($scope.currentDownload) {
            if(this.width > 1) {
                $scope.downloadProgress = this.width - 1;
            }
            $timeout(function( ) {
                updateProgressIndicator( );
            }, 100);
        }
    };
    progress.src = 'http://127.0.0.250:99999/api/v2/downloadprogress?' + new Date( ).getTime( );
}
```

In this example, the embedded web server of desktop application 350 receives the web API call over an unsecure connection (e.g., an HTTP connection), determines the current download status of the content, and sends the file (in this case, a png image) representative of the current download status to web application 345 as follows:

```
app.get('/api/v2/downloadprogress', function (req, res) {
    res.setHeader('Cache-Control', 'no-cache, must-revalidate');
    var dl = Download.getDownloadedPercentage( );
    var img = parseInt(dl.progress) + 1;
    if(dl.state !== 'ready') {
        res.sendfile('assets/images/downloadprogress/' + img + '.png');
    } else {
        res.sendfile('assets/images/downloadprogress/1.png');
    }
});
```

Figure 2E:
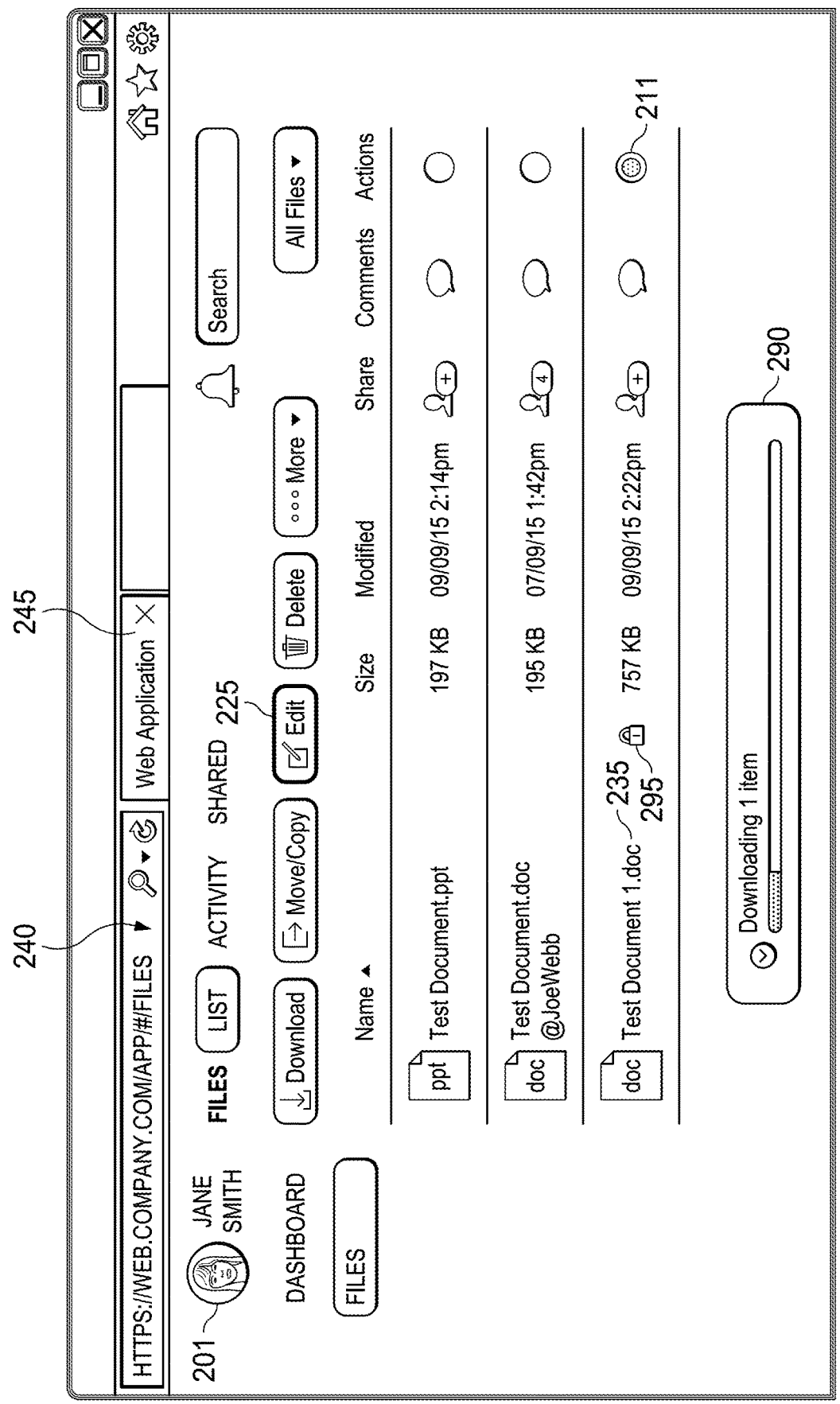

FIG. 2E depicts a diagrammatic representation of portion 247e of the user interface of web application 245 showing download progress bar 290 which, as discussed above, can be generated by web application 245 based on download statuses provided by a local desktop application that communicates with a backend server and that handles the actual file downloading.

Returning to FIG. 3, once the download is complete, desktop application 350 can cause file 331 to open in its native software. For example, a text document may be opened in Office Editor (available from Open Text Corporation), a computer-aided design (CAD) file may be opened in CAD software, etc. From there, the user can interact with the native software to edit file 331. In some embodiments, desktop application 350 may monitor changes made to file 331.

Desktop application 350 can monitor file 331 in many ways. For example, in some embodiments, desktop application 350 may determine whether file 331 has been locked and/or if a native application is launched. As a specific example, suppose desktop application 350 calls an underlying operating system (OS) to open file 331, the OS may return an identification of the application that is running (e.g., "Application X is currently viewing this file"). In that case, desktop application 350 may determine if Application X puts a lock on file 331. If so, desktop application 350 may communicate the locking status of file 331 to application server 320 which, in turn, may place a lock on the server version of file 331 to prevent other users from modifying file 331 while it is being edited. The locking status may be communicated to web application 345 by desktop application 350 and/or application server 320. Web application 345, in turn, may generate an appropriate indicator (e.g., icon 295 shown in FIG. 2E representing a lock) to indicate that file 331 has been locked.

When file 331 is saved (within the native software), file 331 is stored in a folder (of a file system) on the local machine accessible by desktop application 350. Desktop application 350 can upload file 331 or only the changes made to file 331 (i.e., a delta between the previous version of file 331 downloaded from application server 320 and the new version of file 331 now saved on the local machine) to application server 320.

More specifically, in some embodiments, when file 331 is saved (e.g., in Application X), desktop application 350 can be notified (e.g., "Application X has saved this file") and may examine file 331 to see if any changes have been made. In some embodiments, when a file is downloaded by a client application (e.g., desktop application 350) from a backend server, a first hash (hash #1) associated with the file may also be downloaded. This first hash represents a signature of the file. The client application receives the requested file and the first hash and uses the same hash function to generate a second hash (hash #2). The client application then compares the first and the second hashes. If they are the same, then the file is verified (at this point, both the server and the client has the first version of the file and hash #1=hash #2). When on the client the file is changed into a second version and saved, the client application compares the two versions of the file and determines a delta, representing any changes between the two versions of the file. The client application generates a new hash (hash #3) on the full second version and sends the delta, the new hash (hash #3), and the first hash (hash #1) to the server. The server uses the first hash (hash #1) to make sure that it gets the correct file, applies the delta to the file, and uses the new hash (hash #3) received from the client application to verify that the delta is applied to the previous version of the file correctly. Since only the deltas and not the full versions of the files are sent back to the server, this allows for large files to be updated very efficiently and fast.

Figure 2F:
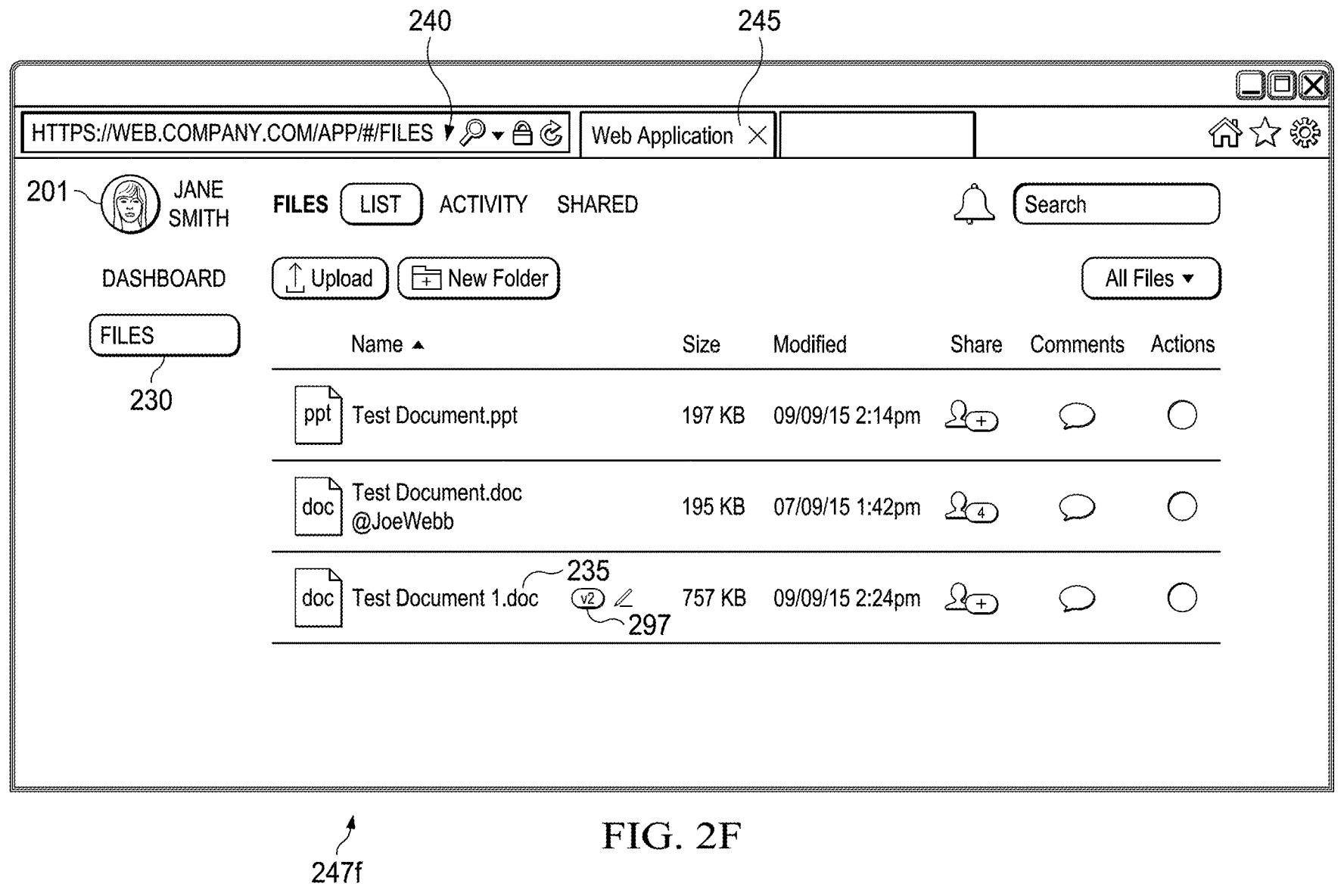

Referring to FIG. 2F, the backend server (e.g., application server 120) may receive and save the changes (or the modified file) at the backend and may communicate to web application 245 that a new version of file 235 has been created. In response, web application 245 may generate an appropriate indicator (e.g., version icon 297) and present same via portion 247f of its user interface. Notice that, at this time, file 235 is no longer locked by user 201 as user 201 has exited out of file 235.

As the above example illustrates, button 225 shown in the user interface of web application 245 represents an edit function provided by a native application associated with a file selected for edit by user 201. This allows user 201 to interact with proprietary file types that normally would not be allowed in web-based editors. Furthermore, user 201 does not need to download and/or install browser plug-ins, ActiveX controls, or the like. Instead, web application 245 can leverage the browse function of browser 240, the communication function of a web server built-in to a desktop application, and the edit function of the native software, all of which can run locally on the same machine as web application 245. When editing of a particular file is needed, web application 245 calls the web server to download the particular file from the backend and provides the ability for user 201 to use native software to do the editing. The desktop application is configured for automatically handling the communications with the backend server to ensure that an edited file is uploaded.

In addition to a web application initiated desktop editing functionality described above, embodiments can be implemented in various ways. For example, in some embodiments, the desktop editing functionality may be initiated from another client side application such as an email application, a messaging application, etc., instead of or in addition to a web application. In some embodiments, the above-described web application and the client application may be implemented for messaging, status update, chat, collaboration, notifications, etc. Numerous embodiments are possible.

Figure 4A:
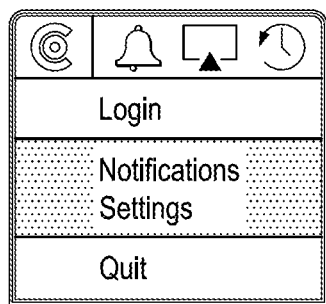
FIGS. 4A-4F depict diagrammatic representations of different user interfaces of a desktop application.
Figure 4B:
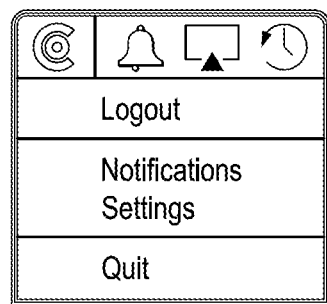

In some embodiments, a user is not required to log in to a desktop client so long as the user is logged in to a web client. When the user selects the edit button, the desktop client can automatically obtain, from the web client, the user ID and credential (e.g., a token) that the user has provided when logging into the web client and use the same user ID and credential to communicate and access the backend server. FIG. 4A depicts a diagrammatic representation of a portion of a user interface showing an example menu of a desktop client when a user is not logged in to a web client. Since the user is not logged in, the menu items are disabled, as shown in FIG. 4A. FIG. 4B depicts a diagrammatic representation of a portion of a user interface showing an example menu of a desktop client when a user is logged in to a web client.

Figure 4C:
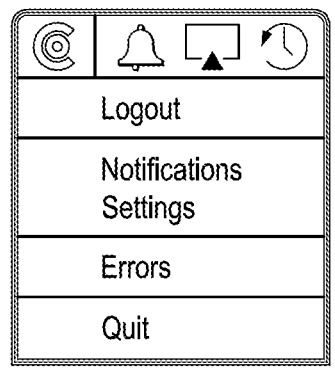
Figure 4D:
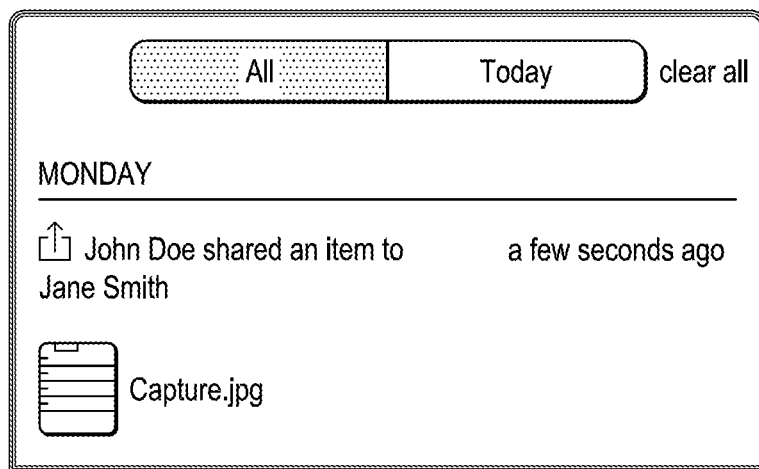
Figure 4E:
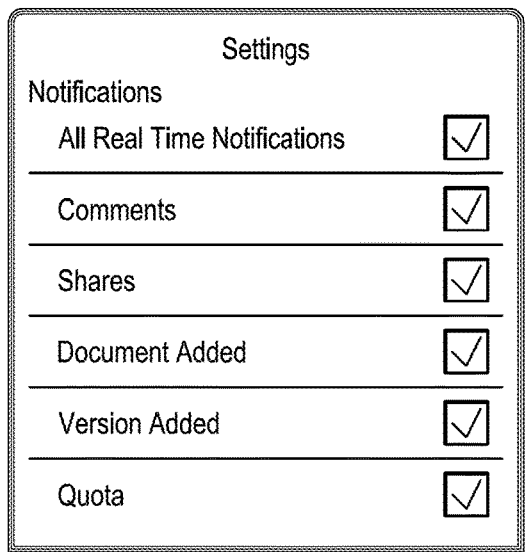

In some embodiments, a user can directly log in to a desktop client and access various menu items such as notifications (see FIG. 4B) and/or error messages (see FIG. 4C). Once the user is logged in to a desktop client, the user can get native notifications and/or error messages even without the browser running. For example, the user can review notifications of events that they missed (see e.g., FIG. 4D) and/or change the settings on how they would like to receive notifications and/or messages (see e.g., FIG. 4E).

Figure 4F:
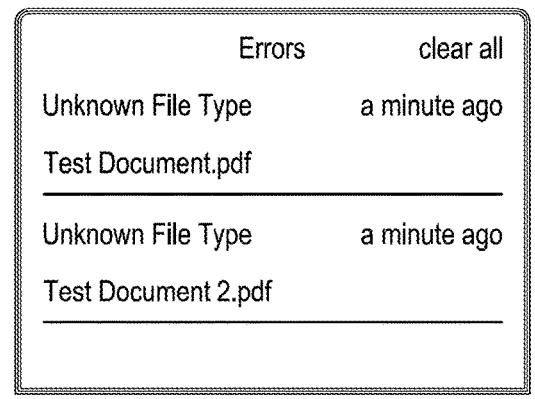

In some embodiments, the user can view errors (e.g., fail to upload, fail to download, etc.) if they have occurred and/or clear them as well (see e.g., FIG. 4F). Menu items can be enhanced and/or modified. Thus, menu items shown in FIGS. 4A-4F are meant to be non-limiting examples.

As it can be seen from the above examples, the user interface of a desktop client (e.g., desktop application 150 of FIG. 1, desktop application 350 of FIG. 3, etc.) may have a limited set of functions. This is because, as discussed above, the desktop client is lightweight and small and is configured mainly to facilitate the communications between a web client (e.g., web application 145 of FIG. 1, web application 245 of FIG. 2, web application 345 of FIG. 3, etc.) and a backend server (e.g., application server 120 of FIG. 1, application server 320 of FIG. 3, etc.).

Figure 5:
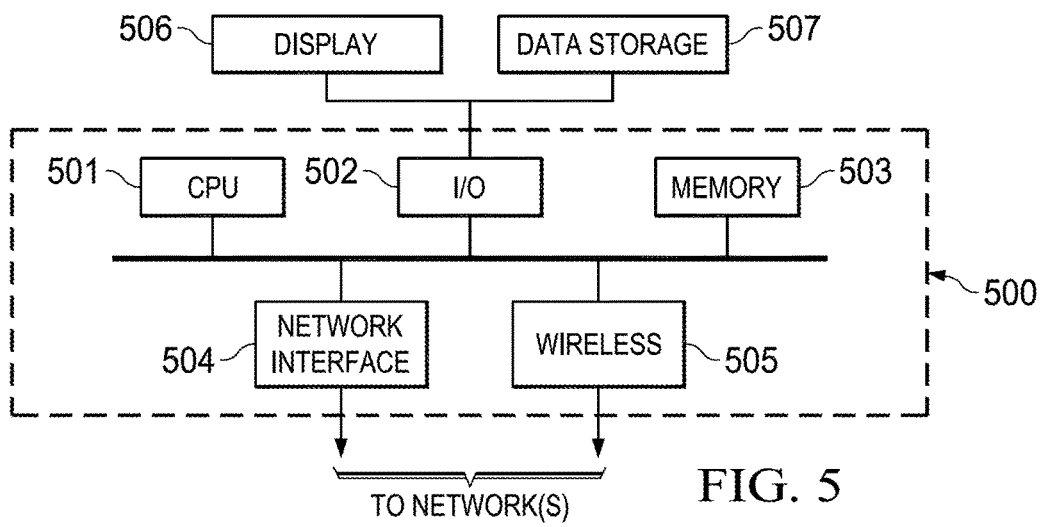
FIG. 5 depicts a diagrammatic representation of a data processing system for implementing some embodiments disclosed herein.

FIG. 5 depicts a diagrammatic representation of a data processing system for implementing some embodiments disclosed herein. As shown in FIG. 5, data processing system 500 may include one or more central processing units (CPU) or processors 501 coupled to one or more user input/output (I/O) devices 502 and memory devices 503. Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 500 can be coupled to display 506, information device 507 and various peripheral devices (not shown), such as printers, plotters, speakers, etc. through I/O devices 502. Data processing system 500 may also be coupled to external computers or other devices through network interface 504, wireless transceiver 505, or other means that is coupled to a network such as a local area network (LAN), wide area network (WAN), or the Internet. The backend servers and client devices described above may each be a data processing system that is the same as or similar to data processing system 500. Additionally, functional components necessary to implement embodiments disclosed herein may reside on one or more data processing systems that are the same as or similar to data processing system 500.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
   receiving, by a web application running in a browser application executing on a user device, a request from a user of the user device to edit a file stored on a backend system operating in a network computing environment, the web application being a web client of the backend system;
   sending, by the web application to a client application over an unsecured connection, a passive content request that specifies a local port of an embedded web server of the client application;
   responsive to the client application being non-responsive to the passive content request, prompting the user, through the browser application, to start or install the client application on the user device; and
   responsive to the client application being responsive to the passive content request or the client application has started on the user device, initiating, by the web application, a process for the client application to download the file from the backend system operating in the network computing environment, the initiating including sending a file download request to the client application, the file download request including an identifier and an authorization for the client application to download the file from the backend system operating in the network computing environment.

2. The method according to claim 1, wherein the network computing environment comprises a cloud computing environment.

3. The method according to claim 1, further comprising:
   receiving, by the web application, non-executable passive content from the client application;
   determining, by the web application, attributes of the non-executable passive content from the client application;
   determining, by the web application based on the attributes of the non-executable passive content from the client application, a version of the client application; and
   determining, by the web application based on the version of the client application, an appropriate application programming interface call for communicating with the embedded web server of the client application.

4. The method according to claim 1, further comprising:
   receiving, by the web application, attributes from the client application;
   determining, by the web application based on the attributes from the client application, a version of the client application; and
   determining, by the web application based on the version of the client application, an appropriate application programming interface call for communicating with an embedded web server of the client application.

5. The method according to claim 1, further comprising:
   receiving, by the web application, attributes from the client application; and
   determining, by the web application based on the attributes from the client application, a download progress of the client application downloading the file from the backend system operating in the network computing environment.

6. The method according to claim 5, further comprising:
   providing, by the web application through the browser application executing on the user device, the download progress to the user of the user device.

7. The method according to claim 1, wherein the local port of the embedded web server of the client application comprises a predetermined Internet Protocol address.

8. A system, comprising:
   a processor;
   a non-transitory computer-readable medium; and
   stored instructions translatable by the processor for a web application running in a browser application executing on a user device to perform:
      receiving a request from a user of the user device to edit a file stored on a backend system operating in a network computing environment, the web application being a web client of the backend system;
      sending, to a client application over an unsecured connection, a passive content request that specifies a local port of an embedded web server of the client application;
      responsive to the client application being non-responsive to the passive content request, prompting the user, through the browser application, to start or install the client application on the user device; and
      responsive to the client application being responsive to the passive content request or the client application has started on the user device, initiating a process for the client application to download the file from the backend system operating in the network computing environment, the initiating including sending a file download request to the client application, the file download request including an identifier and an authorization for the client application to download the file from the backend system operating in the network computing environment.

9. The system of claim 8, wherein the network computing environment comprises a cloud computing environment.

10. The system of claim 8, wherein the stored instructions are further translatable by the processor for the web application to perform:
    receiving non-executable passive content from the client application;
    determining attributes of the non-executable passive content from the client application;
    determining, based on the attributes of the non-executable passive content from the client application, a version of the client application; and
    determining, based on the version of the client application, an appropriate application programming interface call for communicating with the embedded web server of the client application.

11. The system of claim 8, wherein the stored instructions are further translatable by the processor for the web application to perform:
    receiving attributes from the client application;
    determining, based on the attributes from the client application, a version of the client application; and
    determining, based on the version of the client application, an appropriate application programming interface call for communicating with an embedded web server of the client application.

12. The system of claim 8, wherein the stored instructions are further translatable by the processor for the web application to perform:

receiving attributes from the client application; and determining, based on the attributes from the client application, a download progress of the client application downloading the file from the backend system operating in the network computing environment.

13. The system of claim 12, wherein the stored instructions are further translatable by the processor for the web application to perform:

providing, through the browser application executing on the user device, the download progress to the user of the user device.

14. The system of claim 8, wherein the local port of the embedded web server of the client application comprises a predetermined Internet Protocol address.

15. A computer program product comprising a non-transitory computer-readable medium storing instructions translatable by a processor for a web application running in a browser application executing on a user device to perform:

receiving a request from a user of the user device to edit a file stored on a backend system operating in a network computing environment, the web application being a web client of the backend system;

sending, to a client application over an unsecured connection, a passive content request that specifies a local port of an embedded web server of the client application;

responsive to the client application being non-responsive to the passive content request, prompting the user, through the browser application, to start or install the client application on the user device; and responsive to the client application being responsive to the passive content request or the client application has started on the user device, initiating a process for the client application to download the file from the backend system operating in the network computing environment, the initiating including sending a file download request to the client application, the file download request including an identifier and an authorization for the client application to download the file from the backend system operating in the network computing environment.

16. The computer program product of claim 15, wherein the network computing environment comprises a cloud computing environment.

17. The computer program product of claim 15, wherein the instructions are further translatable by the processor for the web application to perform:

receiving non-executable passive content from the client application;

determining attributes of the non-executable passive content from the client application;

determining, based on the attributes of the non-executable passive content from the client application, a version of the client application; and determining, based on the version of the client application, an appropriate application programming interface call for communicating with the embedded web server of the client application.

18. The computer program product of claim 15, wherein the instructions are further translatable by the processor for the web application to perform:

receiving attributes from the client application;

determining, based on the attributes from the client application, a version of the client application; and determining, based on the version of the client application, an appropriate application programming interface call for communicating with an embedded web server of the client application.

19. The computer program product of claim 15, wherein the instructions are further translatable by the processor for the web application to perform:

receiving attributes from the client application; and determining, based on the attributes from the client application, a download progress of the client application downloading the file from the backend system operating in the network computing environment.

20. The computer program product of claim 19, wherein the instructions are further translatable by the processor for the web application to perform:

providing, through the browser application executing on the user device, the download progress to the user of the user device.

\* \* \* \* \*